United States Patent [19]
Naito et al.

[11] 3,889,797
[45] June 17, 1975

[54] AUTOMATIC TRANSPORT SYSTEM

[76] Inventors: Kazuo Naito, 11, Kawada-cho, Ichigaya, Shinjuku-ku, Tokyo; Terumitsu Kondo, 8-2, Nishi-5-chome, Yachiyodai, Yachiyo-shi, Chiba-ken; Kansuke Nakajima, 2-3, Takanedai-cho, Funabashi-shi, Chiba-ken, all of Japan

[22] Filed: Dec. 29, 1972

[21] Appl. No.: 319,858

[30] Foreign Application Priority Data
Dec. 29, 1971 Japan.................................. 47-711

[52] U.S. Cl. ..................... 198/35; 198/38; 198/81; 214/8.5 F
[51] Int. Cl. ............................................. B65g 59/06
[58] Field of Search ................... 198/38, 35, 19, 81; 214/6 P, 8.5 A, 8.5 F

[56] References Cited
UNITED STATES PATENTS

| | | | |
|---|---|---|---|
| 2,353,638 | 7/1944 | Beaulieu et al. | 198/19 |
| 2,728,466 | 12/1955 | Postlewaite et al. | 198/38 |
| 3,049,247 | 8/1962 | Lemelson | 198/38 |
| 3,075,653 | 1/1963 | Wales et al. | 198/38 |
| 3,168,268 | 2/1965 | Bossart et al. | 198/38 |
| 3,307,162 | 2/1967 | Fink | 198/38 |
| 3,725,867 | 4/1973 | Jordan | 198/38 |
| 3,726,383 | 4/1973 | Bornfleth et al. | 198/38 |

*Primary Examiner*—Evon C. Blunk
*Assistant Examiner*—Richard K. Thomson

[57] ABSTRACT

An automatic transport system comprising a main conveyor for transporting containers or pallets which are provided with memory elements for identification and on which workpieces are stacked to receive an assembling or machining operation. A plurality of sub-conveyers are connected to the main conveyer for effecting the assembling or machining operations on the workpieces. The sub-conveyers are intermittently driven in succession to completely synchronize the working operations, while the main conveyer is periodically and freely driven independently of the sub-conveyers under the control of a computer. Thereby conventional accumulation or jamming of pallets caused by defects in the automatic assembling or machining devices or by defectively processed workpieces can be completely eliminated.

3 Claims, 8 Drawing Figures

AUTOMATIC TRANSPORT SYSTEM

BACKGROUND a. Field of the Invention

The present invention relates to an automatic transport system, and more particularly to an automatic transport system which comprises a main conveyer which is freely and periodically driven and a plurality of intermittently driven sub-conveyers for carrying out a series of assembling or machining operations on workpieces composed on a number of small parts.

b. Prior Art

A conventional transport system is known which comprises a main conveyer for transporting workpieces, and sub-conveyers with automatic assembling or machining devices connected to the main conveyer. In this system, the workpieces transported by the main conveyer which are to receive different machining operations are fed to respective sub-conveyers, in accordance with classification methods effected in a well-known manner. Each of the workpieces receives a series of predetermined assembling or machining operations. In this way, the workpieces are machined and again transported to the main conveyer.

This system has the advantage that different kinds of products can be machined by using sub-conveyers connected in parallel with the main conveyer. This system, however, is disadvantageous in that it is difficult to control the flow of workpieces, and in addition the system is complex. More particularly, it is difficult to collect and control the workpieces after they have been distributed and machined along their respective sub-conveyers. Moreover, much time is lost in repairing the sub-conveyer in the event of breakdown of the automatic assembling or machining devices. The greater the different kinds of products, the more time is lost.

There has also been proposed another automatic transport system on which workpieces transported by a sub-conveyer are machined and combined with other workpieces transported by another sub-conveyer by means of automatic assembling or machining devices. The thus machined workpieces are further combined with workpieces transported on the main conveyer to produce new workpieces by means of automatic assembling or machining devices. Additionally, further workpieces transported by another sub-conveyer are combined with these new workpieces to produce another new workpiece by means of automatic assembling or machining devices. In this way, various kinds of workpieces combined with the main workpiece are further transported and machined.

This automatic transport system is disadvantageous in that it requires at least one automatic assembling or machining device at the juncture between each sub-conveyer and the main conveyer. Moreover, in this system, it is difficult to drive the automatic assembling or machining devices in central controlling and to control the speed of each conveyer.

SUMMARY OF THE INVENTION

An object of the present invention is to provide an automatic transport system in which the assembling or machining operation can be carried out completely automatically.

Another object of the invention is to provide an automatic transport system in which an automatic transport system is provided in which sub-conveyers are arranged around a main conveyer, the sub-conveyers being intermittently driven in succession to completely synchronize the advancing speed thereof with the working time required for automatic assembling or machining operations, while the main conveyer is freely driven intermittently and independently of the sub-conveyers under control of a computer, so that the conventional problem due to accumulation or jamming of pallets caused by a defect in the automatic assembling or machining devices or by the removal of defectively produced workpieces can be eliminated completely.

A further object of the present invention is to provide an automatic transport system in which a plurality of intermittently driven sub-conveyers are connected in series along the freely and cyclically driven main conveyer, so that it is possible to minimize the working load of the computer.

The automatic transport system according to the present invention mainly comprises a main conveyer for transporting containers or pallets which are provided with memory elements and on which are stacked workpieces which are to receive the assembling or machining operation, and a plurality of sub-conveyers connected to the main conveyer and including means for effecting the assembling or machining operations on the workpieces.

DETAILED DESCRIPTION

Figure 1:
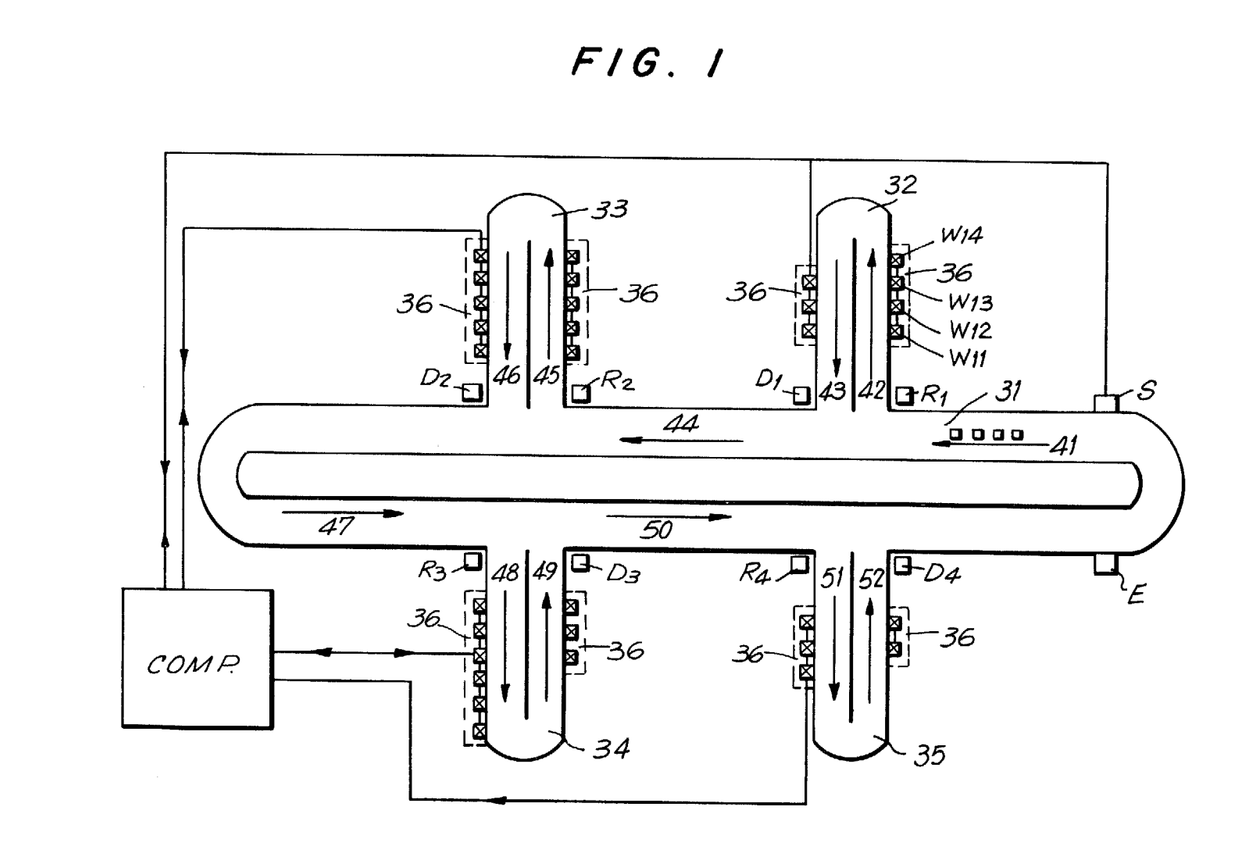
FIG. 1 is a schematic arrangement of one embodiment of an automatic transport system according to the present invention.

Referring to FIG. 1 therein is seen a transport system which comprises a main conveyer 31 for transporting pallets on which workpieces are loaded and which are provided with a memory function. Intermittently driven sub-conveyers 32 to 35 are disposed in succession along main conveyer 31 and automatic assembling or machining devices 36 are mounted along sub-conveyers 32–35 to operate on the workpieces placed on the pallets. A computer COMP serves for controlling the operation of the sub-conveyers 32–35.

Figure 4:
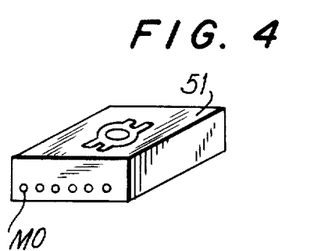
FIG. 4 is a schematic perspective view of a pallet loaded with workpieces to be processed and conveyed by an automatic transport system according to the present invention.

Each pallet 51 (FIG. 4) serves as a workpiece carrier and is provided with memory elements such as the six magnets Mo as shown in FIG. 4. The pallets are coded by selectively magnetizing the six magnets M$o$ on the pallet 51 in well-known manner at a starting sending station S of the main conveyer according to the kind of the workpieces to be processed. Then the pallet loaded with the workpieces is transported in the direction of arrow 41 along the main conveyer 31 and is stopped in front of the first sub-conveyer 32 by any suitable well-known positioning means. The code on the pallet is read out by a reader $R_1$ to send signals to the computer to discriminate the workpieces on the pallet. Then, the pallet on the main conveyer 31 is moved onto the sub-conveyer 32 by means of a conventional industrial robot or pusher operated by a signal from the computer. The workpieces on the pallet are then intermittently successively fed on the sub-conveyer 32 in the direction of arrow 42 and the workpieces are then assembled or machined at each step by means of the automatic assembling or machining devices 36.

After the pallet with the workpieces has been transported on the sub-conveyer 32 in the direction of arrow 43 the workpieces are detected by a detecting device $D_1$, and the pallet is transferred back to the main conveyer 31 again by means of a conventional industrial robot or pusher for transportation on the main conveyer 31 in the direction of arrow 44. When the workpieces arrive at the reader $R_2$ at the entrance to the second sub-conveyer 33, the memory elements on the pallet are read to send signals to the computer COMP. After confirming that the machining previously effected by automatic assembling or machining devices $W_{11}$, $W_{12}$ etc. in the sub-conveyer 32 is satisfactory, the pallet loaded with the workpieces is then fed to the sub-conveyer 33 for assembling or machining at the working stations in succession in the same manner as in the sub-conveyer 32.

The workpieces can be fed to the sub-conveyer 33 only when they have been correctly processed by the assembling or machining devices disposed around the sub-conveyer 32. Otherwise the workpieces are carried in the direction of arrow 44 on the main conveyer 31 without being fed to the sub-conveyer 33. In a similar manner, the pallets loaded with the workpieces, after being subjected to similar processing along the sub-conveyers 34 and 35, are transported to the delivery station E.

The present system has a buffer capability in that, when the intermittently driven sub-conveyer 32 is stopped, or when an automatic assembling or machining device 36 on the sub-conveyer 32 is stopped, the pallets loaded with the workpieces are stored and retained on the main conveyer 31 without being fed to the sub-conveyer 32. When the sub-conveyer 32 is stopped for a long time, an emergency conveyer having the same function as the sub-conveyer 32 is provided in replacement of the sub-conveyer 32. Further the provision of the by-pass on the main conveyer makes possible the selective feeding of the workpieces to the sub-conveyers according to the types or kinds of the workpieces.

The computer controls the pallets loaded with the workpieces through the memory elements, and the assembling or machining device through detectors (not shown) disposed in the automatic assembling and machining devices. The computer is connected to readers $R_1$, $R_2$, $R_3$ and $R_4$, and detectors $D_1$, $D_2$, $D_3$ and $D_4$ for the reasons given previously. The computer is so connected to the respective control elements that it can instruct the automatic assembling or machining devices whether processing of a workpiece on any pallet is to be effected or not.

Figure 2:
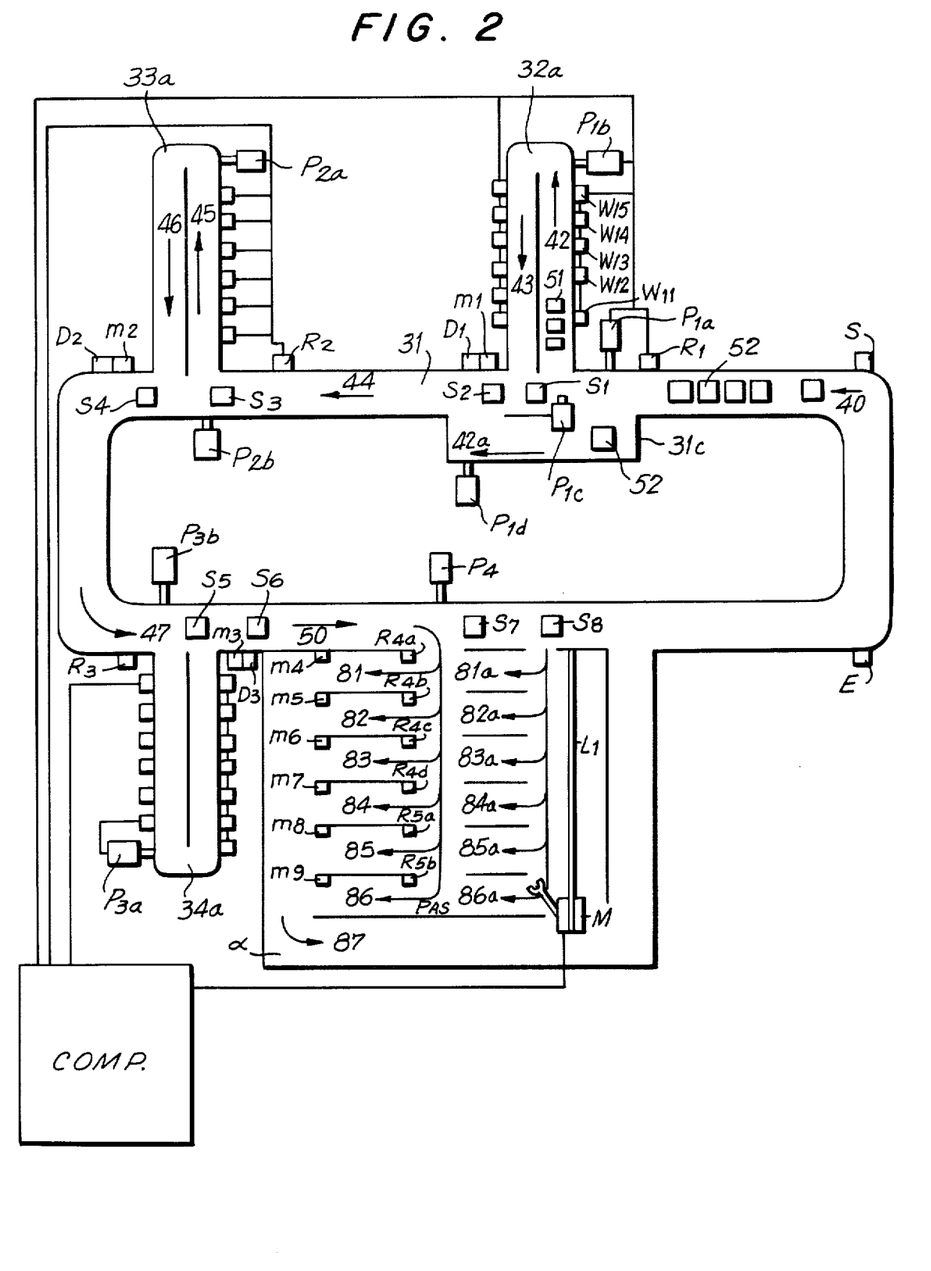
FIG. 2 is a schematic arrangement of another embodiment of an automatic transport system according to the present invention.
Figure 3:
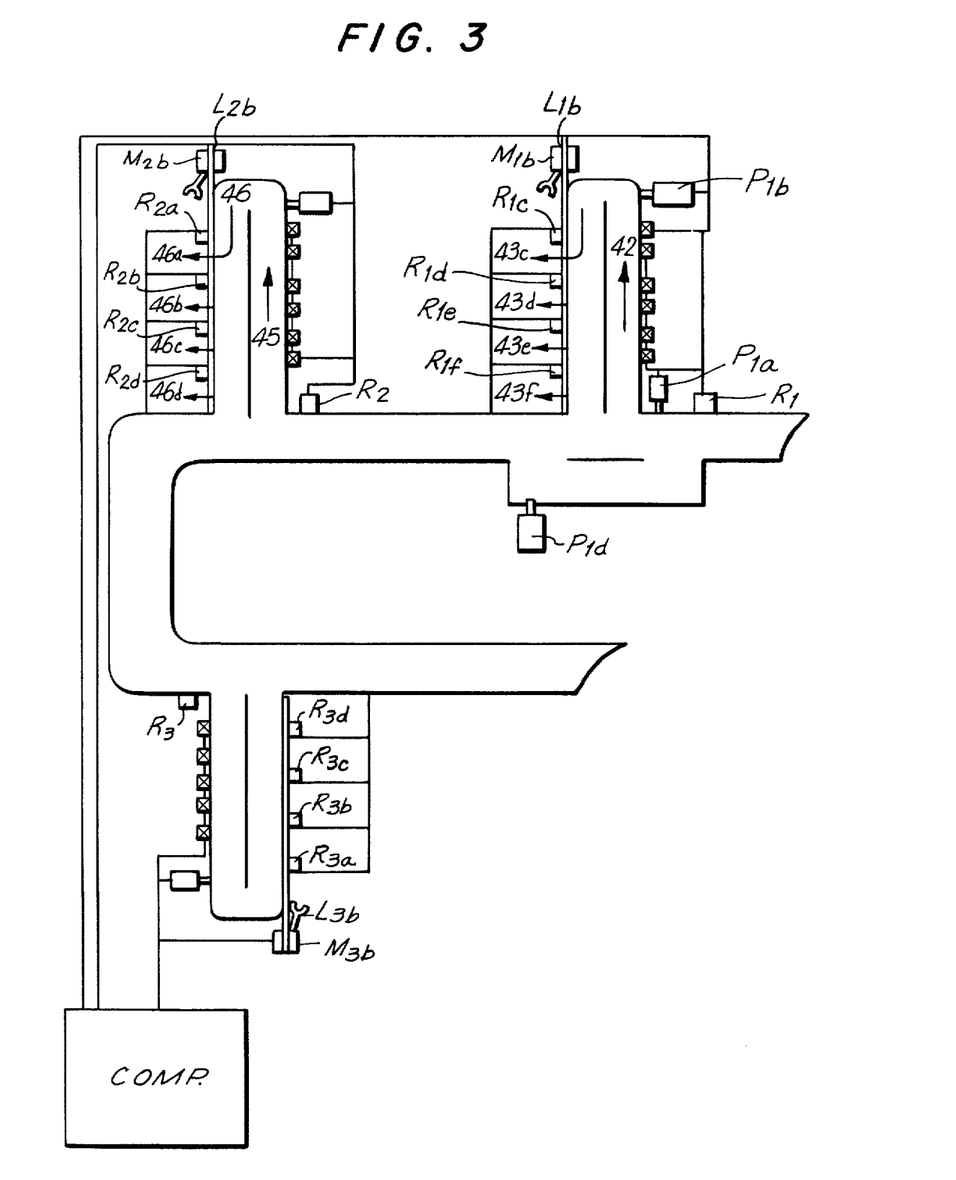
FIG. 3 is a schematic arrangement view of still another embodiment of an automatic transport system according to the present invention.

In FIG. 2 there is shown another embodiment of the automatic transport system according to the present invention wherein main conveyer 31 serves for transporting a container in which a plurality of pallets (with memory elements) are loaded. In the embodiments of FIGS. 2 and 3 the sub-conveyers 32$a$ and 33$a$ are intermittently driven while sub-conveyer 34$a$ is freely driven in periodic fashion. Automatic warehouses or storage stations are provided for storing defective workpieces and for receiving acceptable workpieces which can be delivered as completed products. The computer COMP controls the system.

For convenience of the description of the above embodiments, it is assumed that one of the following is true:

I. All the containers fed from the sending station S onto the main conveyer contain a plurality of pallets each loaded with the same kind of workpieces (i.e., assembled, processed, and machined in the same manner).

II. The pallets are classified and accommodated in the container at the sending station so that the same container may contain the same workpieces in dependence upon where the workpieces are to be processed, i.e., along the sub-conveyer 32$a$, 33$a$ or 34$a$.

III. Different types of workpieces are loaded in the same container and are selectively processed in succession by the automatic assembling or machining devices along the corresponding sub-conveyer under the control of the computer.

Based on the above-mentioned three assumptions, three operations will next be described.

Figure 5:
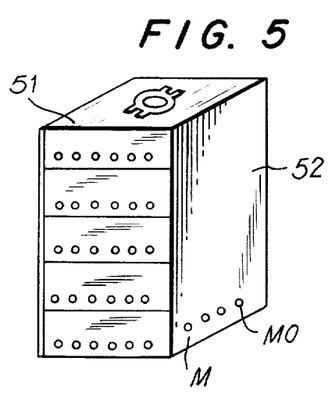
FIG. 5 is a schematic perspective view of a container in which pallets are stacked.

In the case of assumption (I), containers 52 loaded with pallets 51 are provided with memory elements M$o$, as shown in FIG. 5, and the memory elements are coded as regards where the workpieces are to be processed, and the containers advanced on the main conveyer 31 in succession. The container 52 is transported to sub-conveyer 32$a$ and when the workpieces on the pallet of the container are to be processed along the sub-conveyer 32$a$, as detected by a reader $R_1$, the container 52 is halted by a positioning means $S_1$ (shown in FIG. 2). When the container 52 is stopped, a pusher $P_1c$ is operated to push pallets loaded on the container 52 intermittently one by one so as to feed the pallets to the subconveyer 32$a$. The workpieces on the pallet are intermittently advanced in the direction of arrow 42 along the sub-conveyer 32$a$. It is to be noted that all processes are controlled by the computer COMP.

The workpieces on the pallet are successively processed by the automatic assembling or machining devices $W_{11}$, $W_{12}$, $W_{13}$, $W_{14}$ and $W_{15}$. When the workpieces reach the corner of sub-conveyer, the pallets are contacted by a pusher $P_1b$ and advanced in a direction 43 by a second belt of the sub-conveyer 32$a$ to arrive at a location adjacent the main conveyer 31.

The container which has been emptied of the pallets due to unloading at the entrance of the sub-conveyer 32$a$ is advanced along the main conveyer and waits at the juncture between the sub-conveyer 32$a$ and the main conveyer 31 at which the processed pallets are loaded from the sub-conveyer 32$a$ into the waiting container in intermittent manner. When the container is filled with the processed pallets, the container is transported along the main conveyer 31 in the direction of the arrow 44.

The reader $R_2$ reads out the signals produced from the memory elements of the container and the reader $R_2$ transmits the signals to the computer which decides in accordance with its program whether the pallets in the container should be sent to the sub-conveyer 33a by means of a pusher $P_2b$ when the workpieces are to be further processed. The sub-conveyer 33a intermittently positions the pallets exactly in front of the automatic assembling or machining devices associated with sub-conveyer 33a and the workpieces are progressed whereafter the pallets are returned to the waiting container which then advances to the next sub-conveyer 34a and the process is repeated.

The container, after being subjected to the same processing at the sub-conveyer 34a, is stored at an automatically operated warehouse or storage station under control of the computer without being directly transported to a delivery station as in the embodiment of FIG. 1. In this case, the computer instructs the positioning means $S_7$ to stop the container and operate a pusher $P_4$ for unloading the pallets from the container. The pallets are intermittently fed in the direction of arrow PAS and are introduced into different sections of the warehouse according to the signals of the memory read-out by means of the readers $R_4a$, $R_4b$, $R_4c$, $R_4d$, $R_5a$ and $R_5b$ for classified storage in these sections.

In the case of assumption (II), when the workpieces on the pallets in container 52 are not to be processed as detected by means of the reader $R_1$, a pusher $P_1a$ is operated to move the container 52 onto a by-pass conveyer 31c disposed parallel to the main conveyer 31 so that the container travels in the direction of arrow 42a until the container reaches the end of the by-pass conveyer 31c whereupon by the pushing operation of a pusher $P_1d$ the container is returned to the main conveyer and advances in the direction of arrow 44.

When it is decided by the computer that there is no need for processing of the workpieces along the sub-conveyer 33a (by reading the codes by reader $R_2$), the container passes the sub-conveyer 33a together with the preceding containers (whose pallets have been unloaded when the workpieces are processed along sub-conveyer 33a) and are sent in the direction of arrow 47 on the main conveyer. It is to be noted that the sub-conveyer 33a is driven freely and independently of main conveyer 31 in the direction of arrow 46 for the purpose of accomplishing the above-mentioned transportation of the unloaded container together with the preceding processed container.

Thus, the container 52 which has passed the sub-conveyers 32a and 33a advances on the main conveyer 31 towards the next sub-conveyer 34a, where the reader $R_3$ reads the coded signals provided on the container 52 and the computer COMP receives the read-out signals. When the computer COMP determines that processing of the workpieces is to be effected along the sub-conveyer 34a, a positioning means $S_5$ is operated to stop the container 52 and a pusher $P_3b$ is actuated to push the pallets out of the container for transportation on the sub-conveyer 34a. The emptied container advances until it is stopped by a positioning means $S_6$ for the reception from sub-conveyer 34a of the pallets on which the workpieces are completely machined or assembled. The container 52 is then transported to the delivery station E wherein the memory elements on the container are provided with renewed coded signals. It will be appreciated that the workpieces are selectively processed along the sub-conveyers 32a, 33a and 34a.

Assumption III will next be described. Such a case occurs when workpieces on the pallet which have been machined or assembled by the automatic assembling or machining devices $W_{11}$, $W_{12}$, ...$W_{15}$ on the sub-conveyer 32a have been found to be defective; for instance, the workpieces have not been properly machined or assembled by one of those devices. The pallet loaded with a defective workpiece is detected by a detector which transmits a signal to the computer. The pallet is then stacked in the waiting container which has been stopped by the positioning means $S_2$ on the main conveyer 31. The container carrying the defective workpiece advances on the main conveyer 31 and stops at the entrance of the sub-conveyer 33a to send the pallet to the sub-conveyer 33a on which the defective workpiece is intermittently transported. The instructions from the computer may cause the automatic assembling or machining devices provided along the sub-conveyer 33 to be operated to process the inferior workpieces. On the other hand, the automatic assembling or machining devices may be instructed not to operate upon the defective workpieces. Thus, the defective workpiece together with the regular workpieces are stacked into the container on the main conveyer 31 and fed to the sub-conveyer 34a. When the defective workpieces produced on the sub-conveyer 32a or 33a arrives at the sub-conveyer 34a, the computer instructs the automatic assembling or machining devices along the sub-conveyer 34a whether or not work should be done on each defective workpiece in the same manner as in the sub-conveyer 33a.

The defective workpieces, which have or have not been processed along the sub-conveyers 33a and 34a, are stacked in the container whose memory elements are coded to indicate defective workpieces by means of a writing device $m_3$.

When the container carrying the defective workpieces arrives at positioning means $S_7$ which serves to stop the container, pusher $P_4$ is operated to push the pallet loaded with the defective workpiece therefrom to the warehouse along the passage PAS, wherein the pallets loaded with defective workpieces are read-out by readers $R_4a$ to $R_5b$ and stacked in respective containers waiting therefor. The container, stopped by the positioning means $S_7$ on the main conveyer, advances to a positioning means $S_8$ after all the pallets therein have been delivered to the warehouse. At this time, a manipulator M which is displaceable along line $L_1$ feeds the emptied containers to the automatically operated stations 81a, 82a . . . 86a according to the classification. The thus classified containers move on corresponding conveyers 81a to 86a in the warehouse for receiving the pallets classified according to the type of workpieces or the type of defects. The containers are transported along a passage 87 and are sent to delivery station E. The containers with the defective workpieces are returned after classification to the sending station S for renewed processing at the sub-conveyer 32a, 33a or 34a.

In the embodiment of FIG. 2, the container carrying the plurality of pallets, each loaded with a workpiece, is provided with a memory function for controlling its operation. On the contrary, the employment of a container having no memory function can eliminate the necessity of stacking therein a plurality of pallets classified at the sending station S for receiving the same assembling, processing or machining operations, respectively. In this case, the positioning means $S_1$, $S_2$, $S_3$, $S_4$, $S_5$, $S_6$ operate on the container in such a way that all the pallets are successively fed to the sub-conveyers $32a$, $33a$ and $34a$ therefrom, respectively, under the control of the computer to selectively effect processing on workpieces on the coded pallets. It will be appreciated that various kinds of workpieces having separate coded signals pass through all the machines or device on each sub-conveyer in succession. In this case, the container leaving the sub-conveyer $34a$ is stopped by the positioning means $S_7$ so as to transfer pallets to the passage PAS of the automatically operated warehouse in which the pallets are stored according to type or defect.

Alternatively, a plurality of leading pallets may be provided which have the memory elements and between which a plurality of pallets having no memory function are arranged to effect the same processing steps thereon. This makes possible more effective use of the computer.

Referring to FIG. 3, therein is shown another embodiment of a warehouse, which is disposed at each sub-conveyer. These warehouses serve to store the defective workpieces after every operation of the automatic assembling or machining devices provided on the respective sub-conveyers, in order to decrease the number of the memory elements provided on each pallet. The reason for this is that if a workpiece is defectively assembled or machined by the device in the serial and successive processing steps along the intermittently operated sub-conveyers, the pallet loaded with the defective workpiece is directly stored in the warehouse according to the type of defect under the control of the computer COMP. In the case of the embodiment of FIG. 3, the defective workpieces are repaired at each sub-conveyer prior to transportation to the following sub-conveyer. Therefore, the following sub-conveyer receives and conveys no defective workpieces, so that the productive efficiency of the system is improved. Manipulators $M_1b$ to $M_3b$ reciprocating on lines $L_1b$ to $L_3b$, as shown in FIG. 3 may be employed to classify the defective workpieces in the warehouse.

Figure 6:
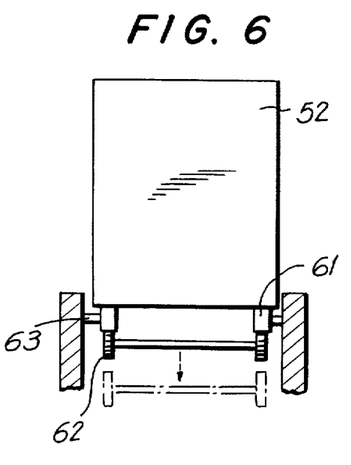
FIG. 6 is a schematic view in section of a main conveyer employed in an automatic transport system according to the present invention.
Figure 7:
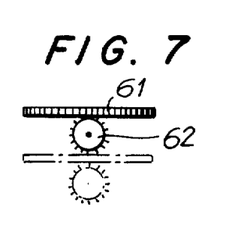
FIG. 7 is a schematic view of a driving mechanism of the main conveyer.

Describing next the buffer function of the automatic assembling or machining devices in FIGS. 2 and 3, the main conveyer 31 can be connected to the sub-conveyers $32a$ and $34a$ with the buffer function by providing the main conveyer with a free cyclic transport system while providing the sub-conveyers $32a$, $33a$ and/or $34a$ with an intermittent or fixed transport system. Such a main conveyer can be constructed as a chain conveyer as shown in FIGS. 6 and 7 wherein the container 52 is disposed on a chain conveyer 61. When the containers 52 are jammed on the chain 61 because of saturated feeding thereof or because the containers are not fed to the sub-conveyer due to stoppage of the sub-conveyer, the load applied to the chain 61 exceeds a predetermined value to the extent that the gear 62 for driving the chain falls to the dotted line position together with the chain, thus resulting in stoppage of the container with its bottom disposed against side walls 63 of the conveyer. It will, therefore, be appreciated that the main conveyer has the buffer function, which becomes more efficient if the workpieces are previously classified by type at the sending station S, since it is possible to select the sub-conveyers in order to supply the pallets thereto according to the type of workpieces, as shown in FIG. 2.

Figure 8:
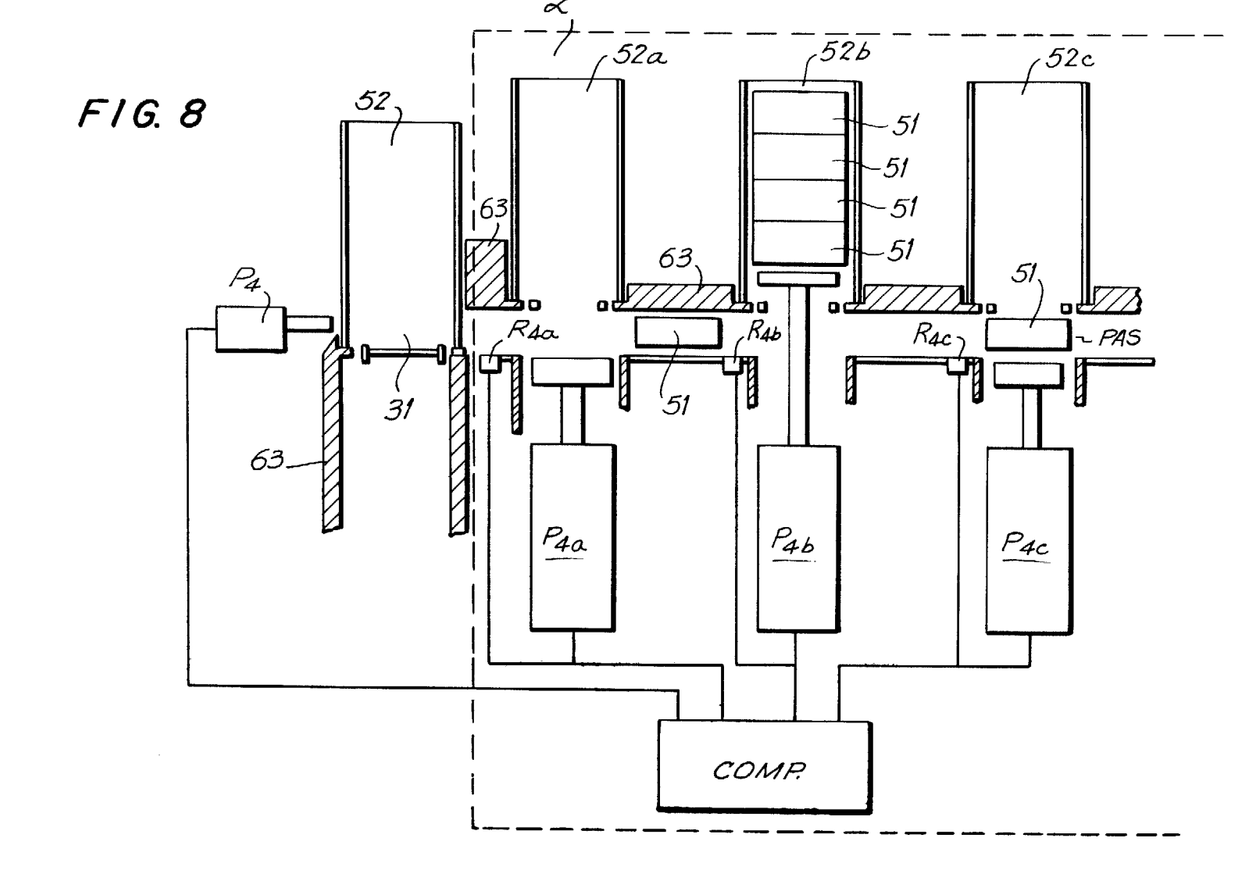
FIG. 8 is a schematic arrangement view of an automatically controlled warehouse used in the present invention.

The automatically operated warehouse is next described in connection with FIG. 8 wherein there are shown containers $52a$, $52b$ and $52c$ for housing the pallets according to the type of defect of the workpieces, respectively.

When the container 52 containing a plurality of pallets is stopped by the positioning means $S_7$, the pallets are pushed out into the passage PAS of the warehouse one by one by means of the pusher $P_4$. The pallet with the workpiece pushed on the passage PAS is intermittently transferred along the passage PAS. In this case, the reader $R_4a$ sends a read-out signals to the computer to detect whether the pallet should be stacked in the container $52a$. If the computer determines that the pallet should not be stacked in the container $52a$, the pusher $P_4a$ is not operated. Thus the pallet 51 advances along the passage PAS to a position under the container $52b$ whereupon the reader $R_4b$ reads the memory elements of the pallet to send the signals to the computer COMP. If the computer determines that the pallet is to be stacked in the container $52b$, the pusher $P_4b$ is operated to stack the pallet 51 in the container $52b$. In this way, the pallets are discriminated by the readers, classified according to the type of defect, and stacked in the corresponding container.

As mentioned above, the automatic transport system according to the invention brings about many advantages owing to the memory function provided on the container, pallets, and automatic assembling or machining devices, and due to the provision of a main conveyer and sub-conveyers with free cyclic or fixed cyclic transport systems.

The advantages are as follows:

a. Since the main conveyer is distinct from the sub-conveyers in respect of the transport system, the number of inputs and outputs to the computer is remarkably decreased to reduce the load of the computer and at the same time to effect the same processing operation on the same kind of workpieces.

b. The processing operations on the sub-conveyers are further assured to facilitate the control of the computer due to the intermittently driven sub-conveyers.

c. The transport speeds of the main conveyer and sub-conveyer are independently controlled by the computer, so that the buffer function on the main conveyer is further increased.

d. The control of the computer is facilitated by arranging the automatic assembling or machining devices in the order of the assembling process taken into account the uni-directional transport of the main conveyer and sub-conveyers.

e. It is possible to easily classify the workpieces according to the type of workpiece to be processed or the type defect by means of the computer.

f. Since the computer can control the automatically assembling or machining devices due to the coded signals produced from the memory elements of the pallets, different kinds of workpieces can be assembled or machined only by stopping a portion of the automatic assembling or machining devices on the sub-conveyer without stopping the entire drive of the sub-conveyer.

g. An auxiliary sub-conveyer having the same function as that of the sub-conveyers can be easily connected with the main conveyer in a parallel manner, thus increasing reliability of the system.

h. The main conveyer or sub-conveyer can be connected to the intermediate warehouse in which the workpieces are stored according to the type of workpieces to be processed or the type of defect to improve the productivity of the automatic transport system.

What is claimed is:

1. An automatic transport system comprising a main conveyer for transporting containers each with a plurality of pallets stacked therein and on which are loaded workpieces to be processed, a plurality of sub-conveyers disposed along said main conveyer in predetermined spaced relation for transporting said pallets delivered from said containers at an intersection location of said two conveyers and for returning the pallets back to the main conveyer after the workpieces have been processed along said sub-conveyer, and means for transporting said pallets from main conveyer to the sub-conveyers, said means including a first positioning means for positioning and stopping said containers on the main conveyer, pushing means for pushing the pallets stacked in the containers stopped by said positioning means one by one so as to transfer the pallets to the sub-conveyers and second positioning means for effecting a stopping operation of a proceeding container at the outlet end of the sub-conveyer to stack the pallets loaded with the processed workpieces therein.

2. An automatic transport system according to claim 1, wherein said containers comprise storage means for regularly storing a plurality of pallets therein.

3. An automatic transport system according to claim 1 wherein said pallets include respective memory elements for identification.

* * * * *